June 10, 1947. G. R. HUNT 2,421,945
CONNECTION FOR WELL EQUIPMENT
Filed April 29, 1944 2 Sheets-Sheet 2
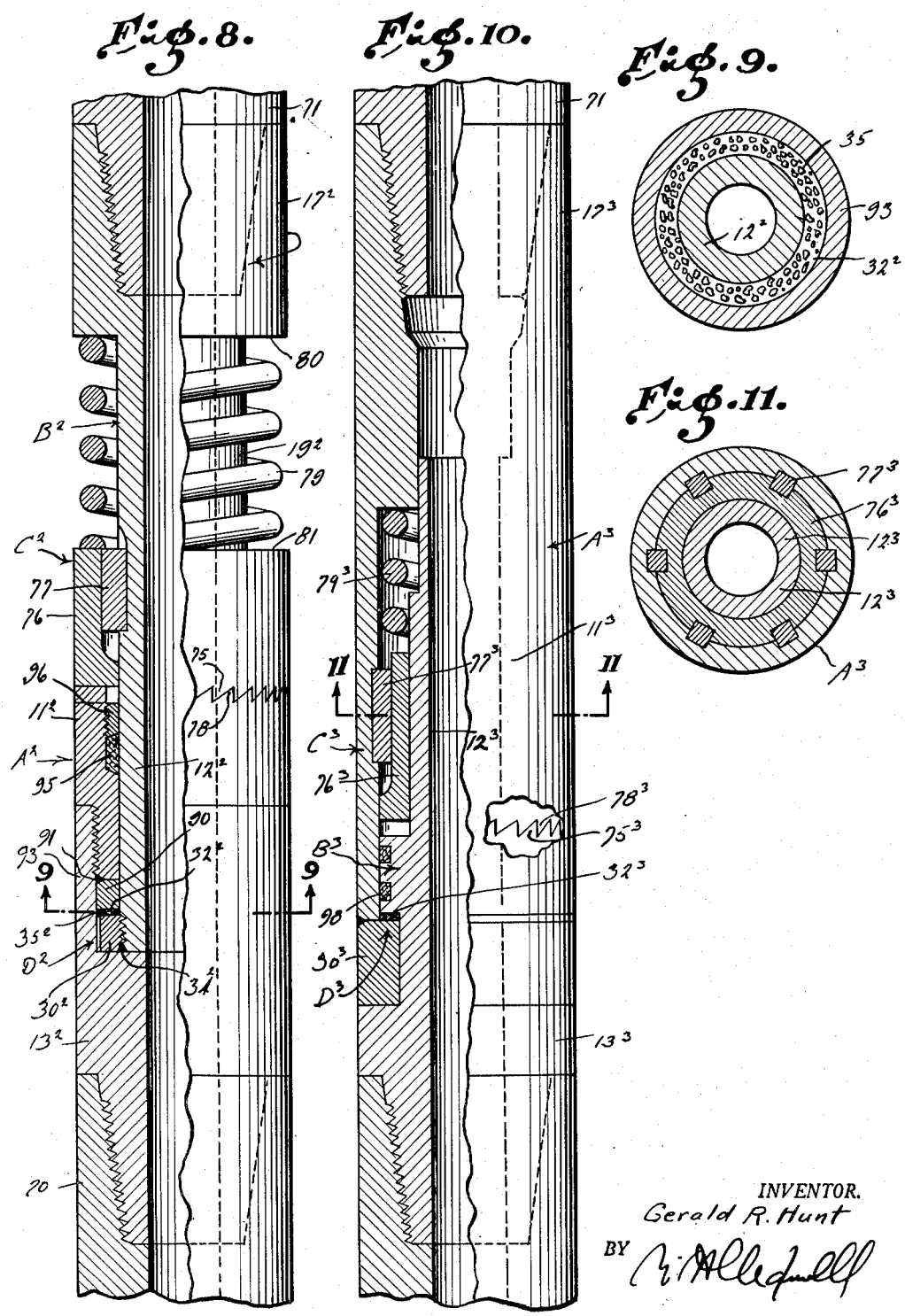
INVENTOR.
Gerald R. Hunt
BY
ATTORNEY Patented June 10, 1947

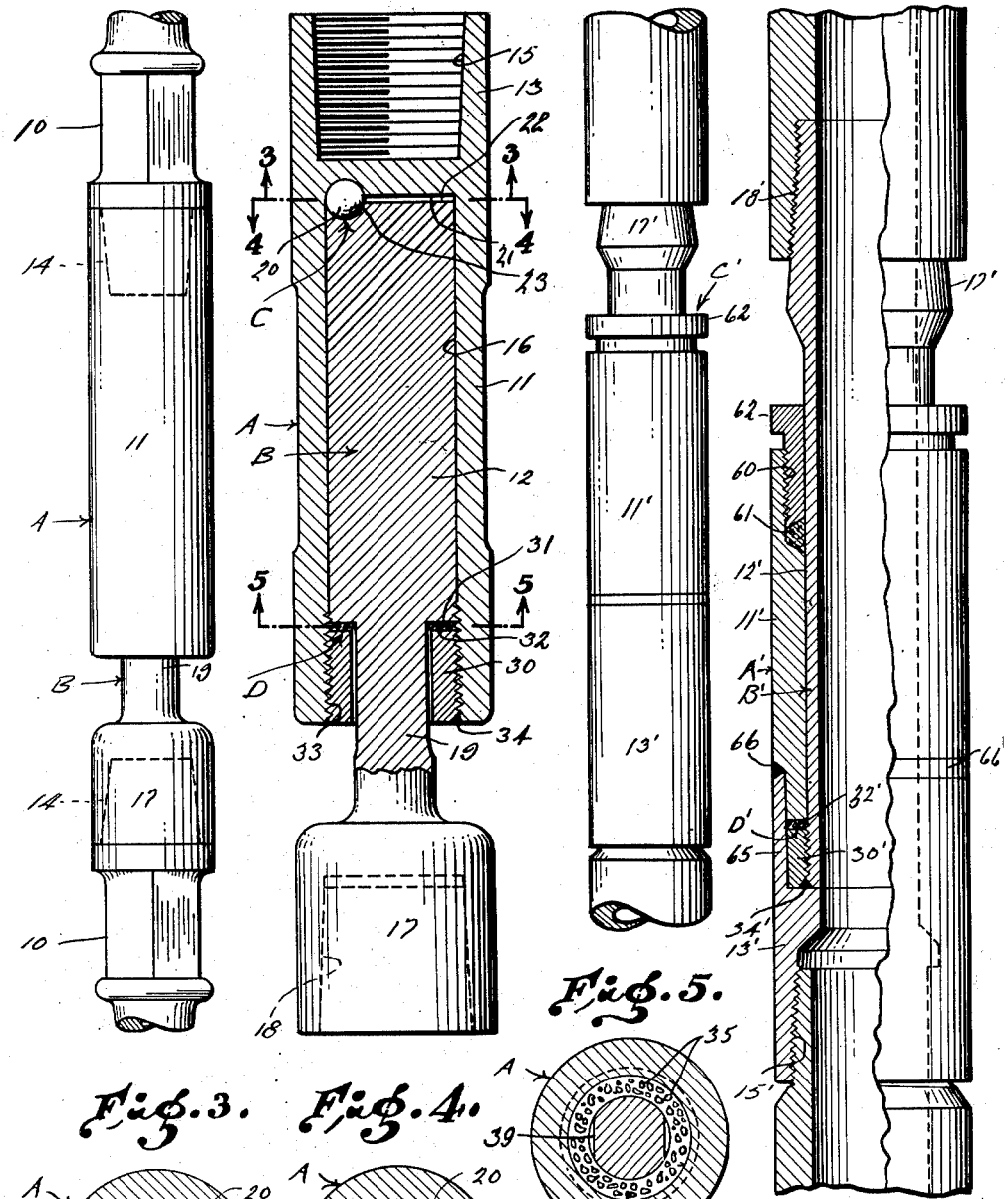

2,421,945

UNITED STATES PATENT OFFICE 2,421,945

CONNECTION FOR WELL EQUIPMENT

Gerald R. Hunt, Riverside, Calif.

Application April 28, 1944, Serial No. 533,149

23 Claims. (Cl. 287—103)

This invention has to do with a connector for well equipment and has particular reference to a joint or connector for use in strings of rods, tubes, or pipe, or for use between such elements and tools or equipment being handled thereby. It is a general object of the present invention to provide a connector which under normal conditions provides a solid, effective and dependable connection but which can be operated in a predetermined manner so that it becomes released or detached.

Tools and equipment of various kinds are operated in wells on or by means of strings of pipe, tubing or rods. These tools or units of equipment or operating strings are sometimes stuck so that they cannot be withdrawn in which case fishing operations must be resorted to to recover or retrieve as much of the equipment as possible. Fishing operations are of themselves hazardous and costly and are not always successful and, therefore, precautions are taken wherever possible to minimize the necessity for fishing operations and to simplify them as far as is practical. Heretofore attempts have been made to minimize or simplify fishing operations by equipping strings operated in wells or by connecting tools or units to operating strings in wells through devices known, generally, as safety joints. These devices are in the nature of releasable joints and are designed, generally, to provide a positive drive in one direction and to be releasable when rotated a predetermined amount in the opposite or reverse direction. Devices of this character have been characterized by mechanisms requiring but a limited reverse movement in order to effect the release and consequently such devices have not been altogether dependable or safe, as they are subject to accidental release through accidental reverse operation.

It is a general object of my invention to provide a connector which may be termed or classed as a safety joint, which is releasable upon a predetermined operation, such that it cannot possibly occur accidentally or without deliberate manipulation or intent on the part of the operator. The tool or joint provided by my invention is characterized by the fact that it is releasable by rotation in a reverse direction but not by a limited amount of movement in that direction. The construction that I have provided will release only after rotation in the reverse direction over a considerable period of time. The period may be as much as an hour, or possibly several hours. It will be apparent that such rotation cannot under any circumstances occur accidentally as can a matter of a few turns in a reverse direction, but can only occur when the operator deliberately and with the necessary intention rotates for a long period of time in the reverse direction.

It is another object of my invention to provide a construction which lends itself to modification so that it can be incorporated to advantage in well strings of various types. The construction of the present invention can be embodied in various forms making it practical and effective in strings of rods, strings of tubing, or strings of drill pipe, these being the types of strings most commonly employed in well drilling and production.

Another object of my present invention is to provide a joint construction which, under normal conditions, is a solid, positive connection providing an effective, dependable coupling and which is totally free of the danger of accidental release due to jarring, slight rotation, or other conditions such as may release the ordinary safety joint.

Another object of my present invention is to provide a means for releasing the joint, which means is absolutely dependable and highly efficient in operation. The means of the present invention is void or free of working parts such as catches, trips, levers, springs, or the like. The construction of the present invention depends entirely upon a known and predetermined action of an element incorporated in the construction, which element will not deteriorate or vary in its action under well conditions such as are encountered in practice.

The various objects and features of my invention will be fully understood from the following detailed description of typical preferred forms and applications of my invention, throughout which description reference is made to the accompanying drawings, in which:

Figs. 1 to 5, inclusive, illustrate a form and application of the invention as applied to sucker rods such as are used in wells for the manipulation of pumps, or the like. Fig. 1 shows the device of the present invention coupled between two adjoining sections of sucker rods, the device being shown in elevation. Fig. 2 is an enlarged detailed longitudinal sectional view illustrating the details of the mechanism of the present invention. Fig. 3 is a detailed transverse sectional view taken as indicated by line 3—3 on Fig. 2. Fig. 4 is a detailed transverse sectional view taken as indicated by line 4—4 on Fig. 2 and Fig. 5 is a detailed transverse sectional view taken as indicated by line 5—5 on Fig. 2.

Figs. 6 and 7 illustrate a form of the invention suitable for use in connection with tubing such as is used in oil wells. Fig. 6 is a view showing the device of the present invention connected between two sections of tubing, the device being shown in elevation, and Fig. 7 is an enlarged view of the device of the present invention, parts being broken away to show in section.

Fig. 8 is a view of an embodiment of the present invention used in a string of drill pipe between the sections of a tool joint, parts being broken away to show in section. Fig. 9 is a sectional view taken as indicated by line 9—9 on Fig. 8.

Fig. 10 is a view of another form of construction for use in a drill string, parts being broken away to show in section, and Fig. 11 is a transverse sectional view taken as indicated by line 11—11 on Fig. 10.

It will be apparent from the drawings that the constructions that I have provided is applicable to various types of strings such as are used in wells and that the invention can be advantgeously incorporated in a string of rods, a string of tubing, or in a drill string. It will also be apparent that the construction of the present invention can be used at the point of connection between a well string and a tool or unit to be operated thereby, and does not have to be incorporated at an intermediate point in the length of the string as I have illustrated in the drawings. When I use the term well string I refer to such construction, generally, and mean to include an arrangement where the device is at the end of the string, as well as being at an intermediate point.

Referring to Figs. 1 to 5, inclusive, I show a form of the invention for use in connection with sucker rods, or the like. In the drawings I have shown the end portions of two lengths of sucker rod 10 with the device of the present invention connected between them. The device of the present invention involves, generally, two sections A and B preferably in telescopic relation, means C establishing a driving connection between the sections and a releasable means D normally retaining the sections together or against operation but subject to manipulation so that the sections are released or allowed to separate.

The section A is an outer section having a tubular body 11 while the section B is an inner section having a stem-like body 12 which fits into or is received within the body 11 of section A. The section A is provided at its outer end with a part 13 for making connection with the well string. When the well string is made up of rod sections with threaded pins 14 at their ends, the coupling part 13 has a threaded socket 15 to receive a pin 14 of a sucker rod section.

The section B, which is the inner section of the construction, involves the stem 12 which slidably fits the bore 16 provided in the body 11 of section A. At the outer end of the section B there is a coupling part 17 similar, generally, to the part 13 of section A. Where the parts 17 is to be connected with a rod section 10 having a threaded pin 14 the part 17 has a threaded socket 18 to receive the pin. In the form of the invention illustrated the stem 12 of section B and the coupling part 17 thereof are connected by a reduced part or neck 19 to accommodate the construction of the means D as will be hereinafter described.

The means C for providing or establishing a driving connection between the sections A and B transmits torque from one section to the other and may vary widely in form and construction, as will be apparent from the several figures of the drawings. In the case under consideration I have provided a simple ratchet drive connection which operates to connect the parts for rotation in one direction while allowing free rotation between the parts in the opposite direction. In the case of rods such as are used in operating pumps, or the like, the normal or principal operation of the string is longitudinally of its length. However, rod rotators are usually employed to impart a limited rotation in one direction in order to keep the joints of the string tight, and it is to effect drive in this direction that I provide the means C.

The means C as shown in Figs. 1 to 4, inclusive, involves a ratchet-like drive formed by a plurality of balls 20 arranged between the bottom 21 of the opening 16 in the body 11 and the inner end 22 of the stem 12 of section B. Spherical sockets 23 are provided in the end 21 to receive the balls so that they are held against rotation bodily relative to the section A. Notches with inclined or pitched bottoms 24 are provided in the end 22 of the section 12. The faces or bottoms 24 of the notches are pitched so that when the section A is rotated in one direction, for instance in the direction that the rods are rotated to keep the joints tight, the balls are wedged between the ends 21 and 22, locking the sections A and B against relative rotation. When the section A is rotated in the opposite direction relative to the section B the balls are allowed to move down the inclined or pitched faces 24 thus releasing the connection means C so that the section A turns freely relative to the section B.

The means D provided by my invention for normally positively retaining the sections together or against separation involves, generally, a stop 30 and a cutter 31. In the arrangement illustrated the stop 30 is in the form of a shoulder or projection on the section A opposite the outer end of the stem 12 of section B, while the cutter 31 is carried by the outer end 32 of the stem 12.

The stop or shoulder 30 may, in some cases, be integral with the section A. However, I prefer to make it a separate part as it may be advantageous to form it of a material varying somewhat in character from that out of which the other portions of the section A are formed.

In the case illustrated the stop 30 is in the form of a sleeve assembled around the neck 19 of the section B and screw-threaded into the threaded end portion 33 of the opening in the section A. The stop thus provided is made tight or fast to the end of the body A in any suitable manner. For instance, as shown in the drawings, I may employ welding at 34.

The cutter 31 provided by my invention is preferably attached or secured to the end 32 of the stem 12 to be fixed or rigid therewith and to operate as a part thereof. In practice I may employ a cutter of any suitable form. However, I prefer to use a cutter formed by welding cutting parts 35 of hard cutting material, or the like, to the end 32 so that such parts face or are exposed to the inner end of the stop 30. It will be apparent that if such cutting parts are fairly large they will have a definite cutting action. The cutting parts may be large enough to have more or less the action of cutting tools in a lathe or machine, whereas if they are smaller or finer they will have more of an abrading action or will act more or less as a grinder. In practice the shape, form, size and number of cutting parts 35 can be varied as desired, varying the cutting action from that of individual metal cutters to the cutting action of a grinding wheel.

The parts are preferably arranged and proportioned so that during normal conditions of use or operation, where the rods are reciprocated and are turned slightly, the cutting parts 35 are merely pressed against the inner end of the stop 30 and the stop 30, being fixed in the end of the body section A, positively retains the stem 12 of the body section B in the section A so that the two sections of the construction are effectively and dependably secured together.

Should it be desired to release or disconnect the device allowing the upper section A to be withdrawn from the well leaving the lower section B in the well the section A is rotated in a reverse direction, this being allowed by the action of the balls 20, as above described. As the section A is rotated in the reverse direction a suitable upward strain may be applied causing the inner end of the stop 20 to be held in engagement with the cutting parts 35 on the section B. As such rotation is continued under such pressure condition the cutting parts 35 will act upon the inner end of the stop 30 and as a consequence will cut or grind it away. If this action is continued for a sufficient period of time the stop 30 will be completely cut or ground away whereupon the stem 12 will freely pass out of the socket or opening 16 of section A allowing the two sections to separate. In the particular form illustrated the flattened parts 39 are provided on the sides of the stem 19 so that cuttings made as a result of the section above described are free to escape so that they do not in any way retard the cutting action.

In the form of the invention shown in Figs. 6 and 7 the device of the invention is employed to connect lengths of tubing or couplings on the ends of tubing sections and the device is itself tubular to form a continuation of the opening through the tubing.

In this form of the invention the outer section A' has a body 11' slidably receiving the stem 12' of the inner section B', a coupling device 13' is provided on the outer end of the section A' with a threaded opening 15' to receive a part of the tubing string, and a coupling part 17' is provided on the outer end of the section B' and has a threaded part 18' to receive a part of the tubing string.

In this form of the invention the means C' for establishing driving connection between the sections A' and B' does not normally have to communicate any appreciable force as there is no tendency for rotation under normal conditions. In this case the means C' may be a friction means. I have shown the means C' in the form of a packing gland which may be tightened to establish a fluid tight connection between the parts A' and B' and also establish friction which normally prevents rotation between the sections. A threaded socket 60 is provided in the inner end of the section A', packing 61 is provided in the inner end of the opening 60, and a follower 62 is threaded in the opening to be tightened against the packing so the packing is held under pressure between the sections A' and B'.

The means D' provided for connecting the sections A' and B' involves a stop 30' on the inner end of the stem 12', and a cutter 32' on the body part 11' of section A'. In this form of the invention the body 11' terminates to form a shoulder facing the inner end of the stop 30' which is applied to the end of the stem 12'. The coupling part 13' is joined to the body 11' by a sleeve 65 which fits over a turned part of the body 11' and is welded to the body 11' at 66. In this form of the invention the stop 30' is in the form of a ring threaded over the end of the stem 12' and made fast thereon by welding 34'. The cutter 32' may be the same as that employed in the form of the invention first described.

In normal operation the structure shown in Figs. 6 and 7 operates as a simple connection between the adjoining parts of the tubing string and it will serve to conduct fluid, or the like, without restriction. If it should be desired to release the connection to allow separation of the sections A' and B' the uppermost section is rotated relative to the lowermost section and a suitable tensile strain is applied so that the cutter 32 is made to act upon and cut away the stop 30'. When the stop has been cut away the sections are released so that they freely separate.

In the form of the invention shown in Fig. 8 the structure of the present invention is applied to a drilling string in which case it is made heavier and in more substantial form. In the particular case illustrated the outer section $A^2$ is applied through coupling part $13^2$ to the body section 70 of a tool joint while the inner section $B^2$ is applied to the pin section 71 of a tool joint.

This form of the invention is similar, generally, to that shown in Figs. 6 and 7 except that the means $C^2$ for providing a driving connection between the sections is designed to carry a substantial load or great strain.

The means $C^2$ as shown in Fig. 8 involves clutch teeth 75 on the inner end of the body $11^2$ of section $A^2$. A clutch collar 76 is slidable on the neck portion $19^2$ of the inner section and is keyed thereto by keys 77 so that it is held against rotation. Clutch teeth 78 are provided on the end of the collar 76 to cooperate with the teeth 75. A heavy compression spring 79 is arranged between the shoulder 80 formed by the coupling part $17^2$ and the other end 81 of the collar 76. With this construction the collar 76 is normally yieldingly held so that its teeth 78 are in meshing engagement with the teeth 75.

The teeth are shaped and pitched so that the collar 76 serves to impart rotary motion from the section $B^2$ to the section $A^2$ in the normal direction of rotation of the drill string. When the section $B^2$ is rotated in the reverse direction the pitched portions or surfaces of the teeth are such as to allow or cause the collar 76 to move longitudinally or lift against the resistance of the spring 79 so that the section $B^2$ rotates in the reverse direction relative to the section $A^2$.

The connecting or coupling means $D^2$ provided in this form of the invention involves a stop $30^2$ applied to and projecting from the inner end of the stem portion $12^2$ of section $B^2$. Welding $34^2$ may be provided for making the stop secure on the stem. A cutter $32^2$ is provided on the body of section $A^2$ to oppose the stop. In this form the cutting parts $35^2$ are applied to a carrier ring 90 which in turn is secured to the body $11^2$ as by welding 91. It will be noted that the stop $30^2$ and the carrier 90 with the cutter $32^2$ applied thereto are within the sleeve part 93 of the section $A^2$ which joins the body $11^2$ and the coupling part $13^2$.

In practice it is desirable to have a fluid tight connection between sections $A^2$ and $B^2$. This may be accomplished through various constructions. I have shown a packing 95 between the body and stem and have provided a follower 96 for compressing the packing.

In operation under normal uses of the drill string the inner section $B^2$ is rotated in the usual clockwise direction, as indicated by the arrow in Fig. 8, and the rotary strain or torque is communicated from the section $B^2$ through the keys 77, the sleeve or collar 76, the teeth 75 and 78 to the section $A^2$. The stop $30^2$ acts to normally positively retain the sections of the device together or against separation, and slight or accidental rotation in the reverse direction permitted by the ratchet drive $C^2$ will have little or no effect on the device.

When it is desired to release the two sections or to separate them an upward strain is applied on the upper section and it is rotated in the reverse direction. The means $C^2$ allows for such rotation and during such rotation the cutter $32^2$ acts on and cuts away the stop $30^2$ and when the rotation has been continued long enough to completely cut away the stop then the sections can be pulled apart.

In Figs. 10 and 11 of the drawings I illustrate a form of the invention somewhat similar to that shown in Fig. 8 except that the general arrangement of the sections is reversed and the means for establishing driving connection between the sections is arranged within the construction so that it is not exposed as is the case in Fig. 8. This form of the invention resembles in some respects the form shown in Fig. 2, in that the stop of the connecting means is on the outer section while the cutter is carried by the stem of the inner section.

In the form shown in Fig. 10 the outer section $A^3$ has its coupling part $17^3$ joined to the pin section $71$ of a tool joint. The coupling part $13^3$ of the inner section $B^3$ is joined to the box section of the tool joint. The stem $12^3$ of the inner section has its inner part reduced to slidably carry a sleeve $76^3$ of the connecting means $C^3$. The sleeve $76^3$ is slidably keyed to the body $11^3$ of the outer section by keys $77^3$. A spring $79^3$ is arranged between the inner end of the opening in the body $11^3$ and one end of the sleeve $76^3$. The other end of the sleeve $76^3$ is provided with downwardly facing teeth $78^3$ which cooperate with upwardly facing teeth $75^3$ on an enlargement of the stem $12^3$. Packing $98$ is provided between the body $11^3$ and the stem $12^3$.

It will be apparent that the construction just described provides a drive connection establishing a positive drive or torque transmission between the outer section $A^3$ and the inner section $B^3$ when the outer section is rotated in a clockwise direction, but allows the section $A^3$ to rotate relative to the section $B^3$ in the reverse direction.

The connecting means $D^3$ provided by my invention involves a stop $30^3$ fixed in the end of the tubular body $11^3$ to be opposed to the cutter $32^3$ carried by the outer end of the stem $12^3$. The cutter $32^3$ may be of the same general character as hereinabove described and this portion of the device may have the same general action as that shown in Fig. 2.

In operating the device just described the sections $A^3$ and $B^3$ will normally positively transmit rotation in the normal direction of operation of the drill string but if it is desired to separate the sections the section $A^3$ is rotated in the reverse direction and tensile strain is applied with the result that the cutter $32^3$ acts on the stop $30^3$ cutting it away until the sections are free to separate.

From the foregoing description of the several different forms of the invention it will be apparent that I have provided a safety joint construction which, under normal conditions, is safe, reliable and effective in coupling parts of the string so that they act in the intended manner. Whenever it is desired to release the construction of the present invention the sections can be operated so that the cutter acts on the stop to cut it away or to destroy it allowing the sections to be moved apart or separated.

It will be apparent that casual or accidental operation in the reverse direction, such as may be required for the actuation or tripping of tools or such as may occur accidentally, will not be such as to have any appreciable effect on the connecting means. The connecting means that I have provided will only release when the tool is deliberately rotated over a considerable period of time in the reverse direction.

It will be apparent that the operation necessary to effect release may be varied to meet the wishes of the operator. If the cutting means is of a form or type that is highly effective or efficient and the stop is of limited extent, the stop will be cut away rapidly. However, if the cutting means is less efficient or effective, and the stop is made longer or of greater extent the time interval will be extended and, in practice it may be extended to many hours, if desired. It will also be apparent that the rate at which the stop is cut away will, in practice, depend largely on how the tool is operated. If little upward strain is applied it will take longer to cut the stop away than if a substantial upward strain is applied and maintained.

Having described only typical preferred forms and applications of my invention, I do not wish to be limited or restricted to the specific details herein set forth, but wish to reserve to myself any variations or modifications that may appear to those skilled in the art or fall within the scope of the following claims.

Having described my invention, I claim:

1. A coupler of the character described including, two sections, and means connecting the sections against separation including, a stop on one section and a cutter on the other section operable by predetermined movement between the sections to cut away the stop.

2. A coupler of the character described including, two sections, and means connecting the sections against separation including, a stop on one section and a cutter fixed on the other section operable by predetermined movement between the sections to cut away the stop.

3. A coupler of the character described including, two sections, and means connecting the sections against separation including, a stop on one section and a cutter on the other section operable by predetermined rotary movement between the sections to cut away the stop.

4. A coupler of the character described including, two sections, means for transmitting torque from one section to the other, and means connecting the sections against separation including, a stop on one section and a cutter on the other section operable by predetermined movement between the sections to cut away the stop.

5. A coupler of the character described including, two sections, friction means for transmitting torque from one section to the other, and means connecting the sections against separation including, a stop on one section and a cutter on the other section operable by predetermined movement between the sections to cut away the stop.

6. A coupler of the character described including, two sections, ratchet means for transmitting torque from one section to the other, and means connecting the sections against separation including, a stop on one section and a cutter on the other section operable by predetermined movement between the sections to cut away the stop.

7. An elongate coupler of the character described including, two sections, and means connecting the sections against separation in coaxial relationship including, an axially facing stop on one section and a plurality of cutting parts fixed to the other section opposite the stop operable by predetermined movement between the sections to cut away the stop.

8. A coupler of the characted described including, two sections, and means connecting the sections against separation including, a stop on one section and a plurality of cutting parts welded to the other section opposite the stop operable by predetermined movement between the sections to cut away the stop.

9. A coupler of the character described including sections having their inner end portions telescopically related, means at the outer ends of the sections for connecting with other parts, a stop on one section holding the sections together, and a cutter on the other section operable by relative movement between the sections to cut away the stop.

10. A coupler of the character described including, an outer section, an inner section carried in the outer section, a stop on one section holding the sections together, and a cutter on the other section operable by relative rotation between the sections to cut away the stop.

11. A coupler of the character described including, an outer section, an inner section carried in the outer section, a stop on the outer section holding the sections together, and a cutter on the inner section operable by relative rotation between the sections to cut away the stop.

12. A coupler of the character described including, an outer section, an inner section carried in the outer section, a stop on the inner section holding the sections together, and a cutter on the outer section operable by relative rotation between the sections to cut away the stop.

13. A coupler of the character described including, two sections normally arranged together, a stop on one section holding the sections against separation, and a member secured to the other section and carrying cutting parts to act on and cut away the stop upon rotation of one section relative to the other.

14. A coupler of the character described including, two sections normally arranged together, a stop welded to one section to hold the sections together, and a cutter carried by the other section to cut away the stop upon predetermined relative movement between the sections.

15. A coupler of the character described including, two sections telescopically related, a ratchet drive between the sections including a spring actuated sleeve slidably keyed to one section and toothed to engage the other section, a stop on one section to hold the sections together, and a cutter on the other section to cut away the stop when the sections are rotated relative to each other.

16. A coupler of the character described including, two sections telescopically related, a ratchet drive between the sections including a spring actuated sleeve slidably keyed to one section and toothed to engage the other section, a stop welded on one section to hold the sections together, and a cutter on the other section to cut away the stop when the sections are rotated relative to each other.

17. A coupler of the character described including, two sections telescopically related, a ratchet drive between the sections including a spring actuated sleeve slidably keyed to one section and toothed to engage the other section, a stop on one section to hold the sections together, and a cutter fixed on the other section to cut away the stop when the sections are rotated relative to each other.

18. A coupler of the character described including, two sections telescopically related, a ratchet drive between the sections including a spring actuated sleeve slidably keyed to one section and toothed to engage the other section, a stop on one section to hold the sections together, and a plurality of hard cutting parts mounted on the other section to cut away the stop when the sections are rotated relative to each other.

19. A coupler of the character described including, two sections one engaging the other, and means connecting the sections against separation including a stop on one section and a cutter operable by predetermined movement between the sections to cut away the stop, there being an opening between the sections for escape of cuttings.

20. A coupler of the character described including two tubular sections arranged together forming a fluid conduit, means connecting the sections against separation including a stop on one section and a cutter operable by predetermined movement between the sections to cut away the stop, and packing between the sections for holding fluid against escape between the sections.

21. A coupler of the character described including two tubular sections arranged together forming a fluid conduit, means connecting the sections against separation including a stop on one section and a cutter operable by predetermined movement between the sections to cut away the stop, and packing between the sections for holding fluid against escape between the sections, there being an opening between the sections to accommodate cuttings formed by the cutter.

22. A coupler of the character described including two tubular sections arranged together forming a fluid conduit, means transmitting torque from one section to the other, means connecting the sections against separation including a stop on one section and a cutter operable by predetermined movement between the sections to cut away the stop, and packing between the sections for holding fluid against escape between the sections.

23. A coupler of the character described including, two tubular sections arranged one within the other, packing between the sections holding fluid against escape from between the sections, means connecting the sections against separation including a stop on one section and a cutter operable by predetermined movement between the sections to cut the stop away, and a ratchet drive between the sections transmitting torque from one section to the other, there being an opening between the sections to accommodate cuttings formed by the cutter.

GERALD R. HUNT.

REFERENCES CITED

The following references are of record in the file of this patent:

UNITED STATES PATENTS

| Number | Name | Date |
| --- | --- | --- |
| 897,196 | Daniel | Aug. 25, 1908 |
| 903,435 | Barrott | Nov. 10, 1908 |